(12) United States Patent
Kadowaki

(10) Patent No.: US 7,718,097 B2
(45) Date of Patent: May 18, 2010

(54) PROCESS FOR PRODUCING A PLASTIC LENS

(75) Inventor: Shinichiro Kadowaki, Tokyo (JP)

(73) Assignee: Hoya Corporation, Tokyo (JP)

( * ) Notice: Subject to any disclaimer, the term of this patent is extended or adjusted under 35 U.S.C. 154(b) by 198 days.

(21) Appl. No.: 11/771,040

(22) Filed: Jun. 29, 2007

(65) Prior Publication Data

US 2008/0001319 A1    Jan. 3, 2008

(30) Foreign Application Priority Data

Jun. 30, 2006 (JP) ............................ 2006-182139
Dec. 18, 2006 (JP) ............................ 2006-339688

(51) Int. Cl.
*B29D 11/00* (2006.01)
(52) U.S. Cl. .................... 264/1.32; 425/174.2
(58) Field of Classification Search ............... 264/1.32, 264/118; 425/174.2
See application file for complete search history.

(56) References Cited

U.S. PATENT DOCUMENTS

2007/0071844 A1 * 3/2007 Kadowaki et al. ........... 425/408

FOREIGN PATENT DOCUMENTS

| JP | H07-164550 | * | 6/1990 |
| JP | H05-064816 | * | 3/1993 |
| JP | 07-164550 | | 6/1995 |
| JP | 07-316250 | | 12/1995 |
| JP | 2001-330701 | | 11/2001 |

* cited by examiner

*Primary Examiner*—Joseph S Del Sole
*Assistant Examiner*—Kimberly A Stewart
(74) *Attorney, Agent, or Firm*—Antonelli, Terry, Stout & Kraus, LLP.

(57) ABSTRACT

A process for producing a plastic lens comprises, using a mold constituted with a pair of mold members facing each other and a plastic gasket which fixes the mold members to form a cavity and has an inlet for injecting a composition of a material monomer into the cavity, injecting the composition of a material monomer into the cavity through the inlet of the plastic gasket, sealing the inlet of the plastic gasket and, thereafter, conducting polymerization, wherein the inlet of the plastic gasket is sealed by the ultrasonic welding. No striae is formed in the produced lens, and the operations of the production can be performed efficiently at a high speed.

7 Claims, 4 Drawing Sheets

(a)　　　　　　　　(b)

(a)　　　　　(b)　　　　　(c)

PROCESS FOR PRODUCING A PLASTIC LENS

BACKGROUND OF THE INVENTION

1. Field of the Invention

The present invention relates to a process for producing a plastic lens. More particularly, the present invention relates to a process for producing a plastic lens which prevents formation of striaes in a lens since it is suppressed that the material monomer composition in an excess amount and present in the inlet of a plastic gasket is drawn into the cavity of a mold for producing a lens during the polymerization, enables to obtain a plastic lens having a uniform composition since the material monomer composition is not affected by rapid and excessive heating and enables to perform the operations for producing the plastic lens efficiently at a high speed.

The present invention also provides a process for producing a plastic lens which provides a plastic lens exhibiting excellent transparency without contamination with foreign substances or clouding and enables to perform the operations for producing the plastic lens efficiently at a high speed since the possibility of contamination of the inside of the cavity due to scattering of powder of the gasket material formed at the portion of the gasket treated by the ultrasonic welding can be eliminated in the ultrasonic welding of the inlet of the plastic gasket.

2. Description of the Related Arts

Recently, plastic lenses have been widely used due to the advantages in that the weight is lighter and the safety is greater than those of inorganic glass lenses. In particular, the diethylene glycol bisallyl carbonate resin (referred to as "CR-39 resin", hereinafter) has been mainly used for the spectacle lenses. However, this resin has a problem in that the refractive index is as small as about 1.50, and the thickness of a lens using the resin is greater than that of glass lenses. Therefore, various proposals have been made to increase the refractive index of the plastic lens (for example, Patent References 1 and 2). Polythiourethane resins obtained by the reaction of a polyisocyanate compound and a polythiol compound which are described in Patent Reference 1 and plastic lenses obtained by polymerization of a compound having epithio group, a polythiol compound and a polyisocyanate compound which are described in Patent Reference 2 are being widely used due to the high refractive index and the great Abbe constant.

In general, the process for producing a plastic lens comprises a step of material preparation in which the main monomer used as the material of the lens and necessary additives are weighed, mixed and stirred to prepare a solution having a uniform composition, a step of injection in which the prepared solution is injected into a mold for producing a lens comprising mold members made of glass or a metal and a gasket made of a plastic, a step of polymerization in which the polymerization is conducted in accordance with a suitable temperature program and a step of separation from the mold in which the lens obtained by the polymerization is taken out of the mold.

When the mold for producing a lens is a mold of the closed type which is constituted with mold members and a gasket having no inlet, the sealing portion of the mold is forced to open in the step of injection, a nozzle is inserted into the formed gap, and a monomer composition is injected into the cavity of the mold through the nozzle. To surely fill the cavity with the monomer composition without leaving bubbles at the inside of the cavity, the monomer composition in an excess amount is injected into the cavity, and the mold is closed by closing the gap at the sealing portion while the monomer composition in the excess amount is expelled to the outside.

In this case, the monomer composition expelled to the outside fouls outside portions of the mold and apparatuses for the production such as a rack used in the production, and this causes drawbacks in that an apparatus for cleaning the fouling is necessary and the lens obtained as the product is fouled. Therefore, the yield of the production is decreased, and the production of the lens may be made impossible depending on the properties of the monomer composition.

Recently, a process in which an inlet used for the monomer composition alone is formed at the gasket and the monomer composition is injected through the formed inlet is becoming popular. In accordance with this process, in general, the monomer composition is injected into the cavity of the mold to gradually fill the cavity. The injection is stopped when the liquid surface reaches the inlet, and the mold is closed by sealing the inlet. In accordance with this process, there is no possibility that the monomer composition overflows to the outside of the mold to cause the above problems. As the process for sealing the inlet, as disclosed in Patent Reference 3, a process in which heat sealing is conducted using a film obtained by laminating a thermoplastic elastomer to an aluminum foil or a plastic film is known.

However, when the rapid and excessive heating in the heat sealing affects the monomer composition, abnormal reactions tend to take place, and it becomes difficult that a uniform plastic lens is obtained. Therefore, it is necessary that the portion for the heat sealing be separated from the monomer composition by some distance so that the heating does not affect the monomer composition. Since the monomer composition in the portion of the inlet is drawn toward the cavity due to contraction of the volume in the step of polymerization, it is necessary that the monomer composition at least in the amount corresponding to the amount drawn toward the cavity be present in the portion of the inlet. When it is difficult that the amount of the liquid present in the portion of the inlet is controlled accurately in the injection, it is necessary that the amount of the liquid present in the portion of the inlet be increased so that the difficulty caused by the fluctuation in the amount is overcome. When the amount of the monomer composition drawn toward the cavity from the portion of the inlet exceeds a specific value, the effect of the monomer composition drawn toward the cavity on the polymerization cannot be neglected, and the condition of the polymerization in this region becomes uneven. Due to this effect, characteristic striaes are frequently formed in the produced plastic lens at the portions in the vicinity of the inlet. A process which can overcome the above problems has been desired.

[Patent Reference 1] Japanese Patent Application Laid-Open No. Heisei 7(1995)-316250.

[Patent Reference 2] Japanese Patent Application Laid-Open No. 2001-330701

[Patent Reference 3] Japanese Patent Application Laid-Open No. Heisei 7(1995)-164550.

SUMMARY OF THE INVENTION

The present invention has been made to overcome the above problems and has an object of providing a process for producing a plastic lens which prevents formation of striaes in a lens since it is suppressed that the material monomer composition in an excess amount and present in the inlet of a plastic gasket is drawn into the cavity of a mold for producing a lens during the polymerization, enables to obtain a plastic lens having a uniform composition since the material monomer composition is not affected by rapid and excessive heating and enables to perform the operations for producing the plastic lens efficiently at a high speed.

As the result of intensive studies by the present inventor, it was found that, in the process comprising injecting a composition of a material monomer into a cavity of a mold for producing a lens through an inlet disposed at a plastic gasket and conducting the polymerization after the inlet is sealed, the above object could be achieved by conducted the sealing of the inlet in accordance with a specific process. The present invention has been completed based on the knowledge.

The present invention provides the following processes for producing a plastic lens:

1. A process for producing a plastic lens which comprises, using a mold constituted with a pair of mold members facing each other and a plastic gasket which fixes the mold members to form a cavity and has an inlet for injecting a composition of a material monomer into the cavity, injecting the composition of a material monomer into the cavity through the inlet of the plastic gasket, sealing the inlet of the plastic gasket and, thereafter, conducting polymerization, wherein the inlet of the plastic gasket is sealed by ultrasonic welding.

2. A process for producing a plastic lens described in 1, wherein the sealing of the inlet of the plastic gasket by ultrasonic welding is conducted under a condition such that a portion of the inlet of the gasket to be sealed by ultrasonic welding is closed under a pressure and a portion of the inlet of the gasket at a side of the cavity from the portion to be sealed by ultrasonic welding is tightly closed.

3. A process for producing a plastic lens described in 2, wherein the closing under a pressure of the portion of the inlet of the gasket to be sealed by ultrasonic welding is conducted by holding the portion between a hone and an anvil under a pressure, and the tight closing of the portion of the inlet of the gasket at a side of the cavity from the portion to be sealed by ultrasonic welding is conducted using a pressing tool and a receiving tool facing the pressing tool simultaneously when or before the closing under a pressure is conducted.

4. A process for producing a plastic lens described in 2, wherein the closing under a pressure of the portion of the inlet of the gasket to be sealed by ultrasonic welding and the tight closing of the portion of the inlet of the gasket at a side of the cavity from the portion to be sealed by ultrasonic welding are conducted by holding the portions between a hone and an anvil at least one of which has a step-shaped depression on a holding face in a manner such that a portion having a greater gap between the holding faces of the hone and the anvil is disposed at a side of the cavity from the portion to be sealed by ultrasonic welding, and the dosing under a pressure and the tight dosing are conducted simultaneously.

5. A process for producing a plastic lens described in any one of 1. to 4., wherein the plastic gasket is obtained by using an olefin-based thermoplastic resin.

To summarize the advantages of the present invention, in accordance with the process of the present invention, it is suppressed that the material monomer composition in an excess amount and present in the inlet formed at the plastic gasket is drawn into the cavity of the mold during the polymerization. Therefore, no striae is formed in the plastic lens obtained by the polymerization at the portion corresponding to the portion in the vicinity of the inlet. The material monomer composition is not affected by rapid and excessive heating. Therefore, the plastic lens having a uniform composition can be obtained, and the operations for producing the plastic lens can be conducted efficiently at a high speed.

The sealing of the inlet of the plastic gasket by the ultrasonic welding is conducted in the condition such that a portion of the inlet of the gasket at the side of the cavity from the portion to be sealed by the ultrasonic welding is tightly closed. Therefore, the possibility of contamination of the inside of the cavity due to scattering of powder of the gasket material formed at the portion of the gasket treated by the ultrasonic welding can be eliminated, and the plastic lens exhibiting excellent transparency can be obtained without contamination with foreign substances or clouding.

Figure 1:
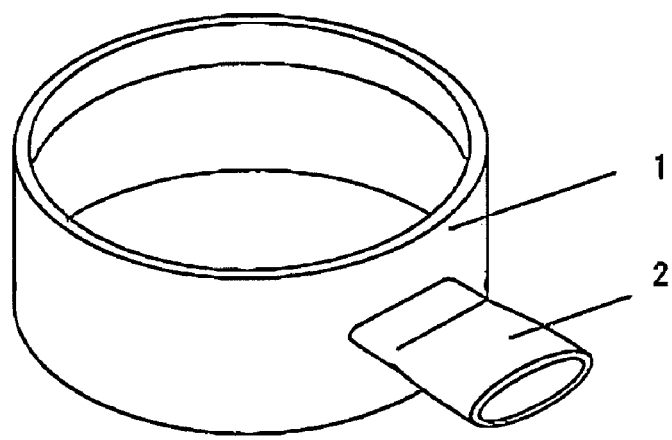
FIG. 1 shows a perspective view exhibiting an embodiment of the gasket used in the present invention.

The numbers in the figures have the meanings as listed in the following:

1: A main portion of a gasket
2: An inlet
3: An upper mold member
4: A lower mold member
5: A cavity
6: A nozzle
7: A monomer composition
8: A heat seal film
11: A mold
12: An inlet
13: A hone
14: An anvil
15: A pressing tool
16: A monomer composition
17: A portion to be sealed by the welding or a portion sealed by the welding
18: A tightly closed unwelded portion
21: A mold
22: An inlet
23: A hone
24: An anvil
25: A monomer composition
26: A portion to be sealed by the welding or a portion sealed by the welding
27: A tightly closed unwelded portion

DESCRIPTION OF THE PREFERRED EMBODIMENTS

The mold used in the present invention is constituted at least with a pair of mold members facing each other and a plastic gasket which fixes the mold members to form a cavity and has an inlet for injecting a material monomer composition into the cavity. The optical faces (the convex face and the concave face) of the plastic lens are formed with the pair of mold members facing each other. FIG. 1 shows a perspective view exhibiting an embodiment of the gasket used in the present invention. The plastic gasket used in the present invention is, as shown in FIG. 1, constituted with a main portion 1 of the gasket and an inlet 2 for injecting the material monomer composition. The main portion 1 of the gasket has a ring shape or a cylindrical shape, and the pair of mold members are fitted into the inner wall of the main portion of the gasket at a prescribed distance to each other. The inlet 2 is disposed at an opening formed on the wall of the main portion of the gasket 1 between the pair of the mold members. The number of the inlet may be one or may be two or greater. Although the inlet 2 may have any desired shape, it is necessary that the inlet 2 have a shape such that the injection of the material monomer composition is facilitated and the ultrasonic welding is conducted smoothly. From this standpoint, preferable examples of the inlet include cylindrical inlets having a sectional shape of a circle, an ellipse and a round lamellar shape.

As the plastic gasket described above, a molded article obtained by using a thermoplastic resin can be advantageously used. Among the thermoplastic resins, olefin-based elastomers are preferable from the standpoint of the molding property, flexibility, heat resistance, stability to the monomer and price. Examples of the olefin-based elastomer include polyethylene-based elastomers comprising low density polyethylene, polypropylene-based elastomers comprising a rubber component finely dispersed in the homopolymer of propylene, ethylene-vinyl acetate copolymers and ethylene-alkyl acrylate copolymers.

Figure 2:
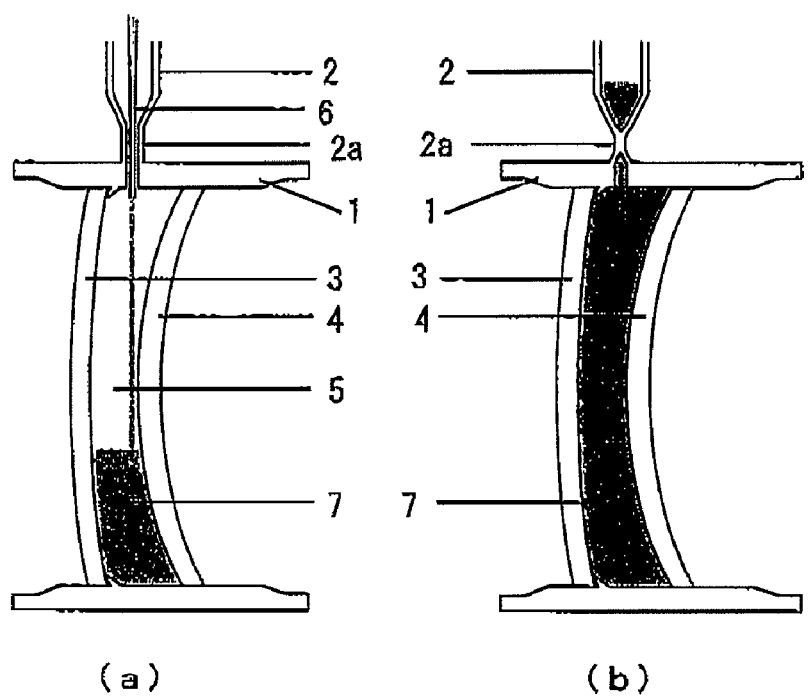
FIG. 2 shows a schematic process diagram exhibiting an embodiment of the process for producing a plastic lens of the present invention.

The process for producing a plastic lens of the present invention will be described with reference to FIG. 2. FIG. 2 shows a schematic process diagram exhibiting an embodiment of the process for producing a plastic lens of the present invention. In FIG. 2, the plastic gasket constituted with a main portion 1 and an inlet 2 of the gasket is the plastic gasket shown in FIG. 1. In FIG. 2, 3 means an upper mold member, and 4 means a lower mold member. The upper mold member 3 and the lower mold member 4 are fitted into the main portion 1 of the gasket at a prescribed distance between each other so that a cavity 5 is formed.

As shown in FIG. 2(a), a monomer composition 7 is injected into the cavity 5 through a nozzle 6 inserted into the inlet 2. The nozzle 6 is connected to an apparatus for injection which is not shown in the figure, and the apparatus for injection is connected to a tank filled with the monomer composition which is not shown in the figure. The injection of the monomer composition is conducted, in general, by adding a pressure with the air or nitrogen or by using a pump. A combination of these methods may be used.

As shown in FIG. 2(b), the injection of the monomer composition is conducted until the monomer composition 7 fills the cavity 5 and reaches an upper portion of the inlet 2. Then, a portion 2a of the inlet 2 closer to the cavity 5 is sealed by the ultrasonic welding. Thereafter, the monomer composition 7 is polymerized, and a plastic lens is obtained.

In the process for producing a plastic lens of the present invention, it is preferable that the sealing of the inlet of the plastic gasket by the ultrasonic welding is conducted under a condition such that the portion of the inlet of the gasket to be sealed by the ultrasonic welding is closed under a pressure and a portion of the inlet of the gasket at a side of the cavity from the portion to be sealed by the ultrasonic welding is tightly closed. When the sealing of the inlet is conducted by the ultrasonic welding, it is frequently observed that powder of the resin material for the gasket is scattered at portions in the vicinity of the portion sealed by the welding due to the vigorous ultrasonic vibration. When the powder is mixed into the cavity for the plastic lens, problems such as contamination with foreign substances, fouling and clouding arise to the lens, and the value of the lens as the commercial product is adversely affected to a great degree. The possibility of the contamination at the inside of the cavity can be eliminated by satisfying the above condition, and a plastic lens exhibiting excellent transparency can be obtained without contamination with foreign substances or clouding. Examples of the above process include process (i) and process (ii) described in the following.

In process (i), the closing under a pressure of the portion of the inlet of the gasket to be sealed by the ultrasonic welding is conducted by holding the portion between a hone and an anvil under a pressure, and the tight closing of the portion of the inlet of the gasket at the side of the cavity from the portion to be sealed by the ultrasonic welding is conducted by holding the portion under a pressure using a pressing tool and a receiving tool facing the pressing tool simultaneously when or before the closing under a pressure is conducted.

Figure 3:
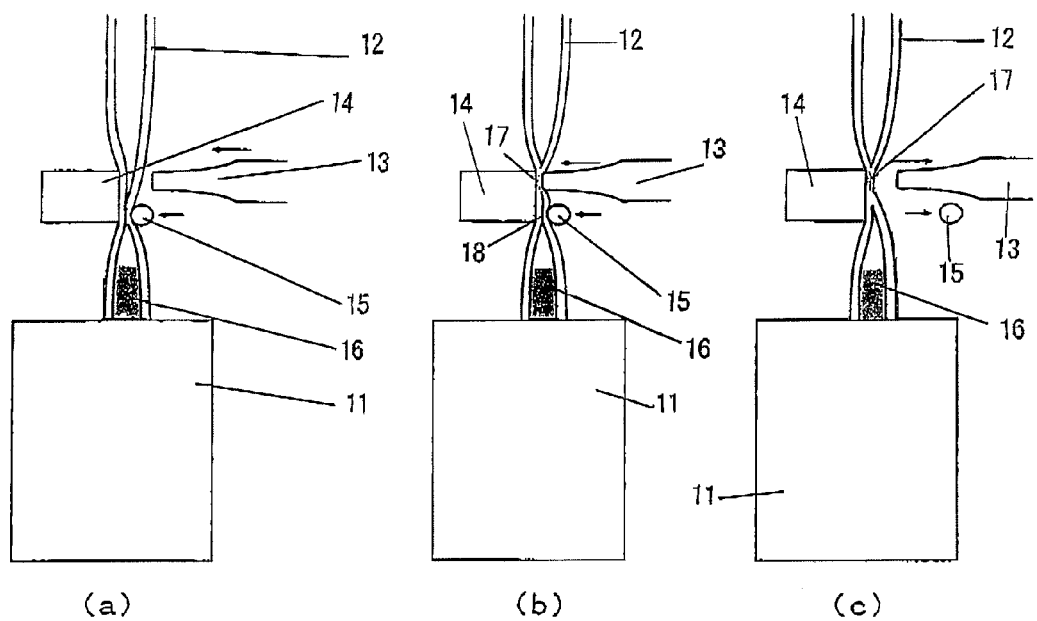
FIG. 3 shows a schematic process diagram exhibiting an embodiment of the process for producing a plastic lens of the present invention.

Process (i) will be described in the following with reference to FIG. 3. FIG. 3 shows a schematic process diagram exhibiting an embodiment of the process for producing a plastic lens of the present invention. In the process shown in FIG. 3, the tight closing described above using a pressing tool and a receiving tool facing the pressing tool is conducted before the welding. In FIG. 3, in the mold 11, mold members similar to the upper mold member 3 and the lower mold member 4 shown in FIG. 2 are fitted into a main portion 1 of the gasket at a prescribed distance to each other so that a cavity not shown in the figure is formed between the two mold members.

As shown in FIG. 3(a), when the monomer composition 16 fills the inside of the cavity not shown in the figure and reaches the inlet 12, a portion of the inlet 12 is held by an anvil 14 and a pressing tool 15 under a pressure. The holding under a pressure is conducted to a degree such that the inner walls of the inlet 12 are kept in the tightly attached condition. In FIG. 3, the holding under a pressure is conducted using a pressing tool 15 and an anvil 14. However, a tool other than the anvil may be used as the tool facing the pressing tool as long as the inner walls of the inlet 12 are kept in the tightly attached condition. Since the ultrasonic wave is not transmitted to the inner wall of the inlet 12 in the tightly attached condition described above, the portion held by the pressing tool 15 and the anvil 14 under a pressure is not welded with the ultrasonic wave and remains as an unwelded portion. In FIG. 3, the liquid surface of the monomer composition 16 in the inlet 12 does not reach the position of the pressing tool 15 in the inlet 12 or the position of the welding in the inlet 12. However, the above descriptions can be applied when the liquid surface of the monomer composition is at a position beyond the position of the pressing tool 15 or the position of the welding.

Then, as shown in FIG. 3(b), a portion at the outside from the portion held by the anvil 14 and the pressing tool 15 under a pressure is held by an anvil 14 and a hone 13 under a pressure. While the anvil 14 and the hone 13 are pressed to each other under an increased pressure, ultrasonic wave is applied through the hone 13, and the portion held between the anvil 14 and the hone 13 under a pressure is welded with the ultrasonic wave (the portion sealed by the welding 17). In the procedure, gases and powder of the gasket material formed at the portion sealed by the welding 17 are blocked at the tightly closed unwelded portion 18 and do not diffuse further into the side of the cavity. When the liquid surface of the monomer composition 16 in the inlet 12 is at a position beyond the position of the pressing tool 15 in the inlet 12 and the position of the welding in the inlet 12, an action in the direction of compression is generated by the pressing of the hone during the welding, and the monomer composition present in the space between the portion sealed by the welding 17 and the tightly closed unwelded portion 18 is vigorously expelled to the outside of the space due to the reaction to the action. The powder of the gasket material formed with the ultrasonic wave during the welding is expelled along with the above flow and does not diffuse to the side of the cavity. When the ultrasonic welding is completed, as shown in FIG. 3(c), the hone 13 and the pressing tool 15 are released, and the holding by the hone 13 and the pressing tool 15 pressed to the anvil 14 is released. The powder of the gasket material remains at the expelled position and does not diffuse into the cavity after the pressing tool 15 is released.

In the process shown in FIG. 3, the tight closing of the inner walls of the inlet 12 by the anvil 14 and the pressing tool 15 is started before the sealing of the inlet 12. The same effect can be obtained when the above tight closing is conducted simultaneously with the sealing of the inlet 12, i.e., the holding by hone 13 under a pressure.

In accordance with process (i), the possibility of contamination in the cavity can be eliminated, and the plastic lens exhibiting excellent transparency can be obtained without contamination with foreign substances or clouding.

In process (ii), the closing under a pressure of the portion of the inlet of the gasket to be sealed by the ultrasonic welding and the tight closing of the portion of the inlet of the gasket at a side of the cavity from the portion to be sealed by the ultrasonic welding are conducted by holding the portions between a hone and an anvil at least one of which has a step-shaped depression on the holding face in a manner such that a portion having a greater gap between the holding faces of the hone and the anvil is disposed at the side of the cavity from the portion to be sealed by the ultrasonic welding, and the closing under a pressure and the tight closing are conducted simultaneously.

Figure 4:
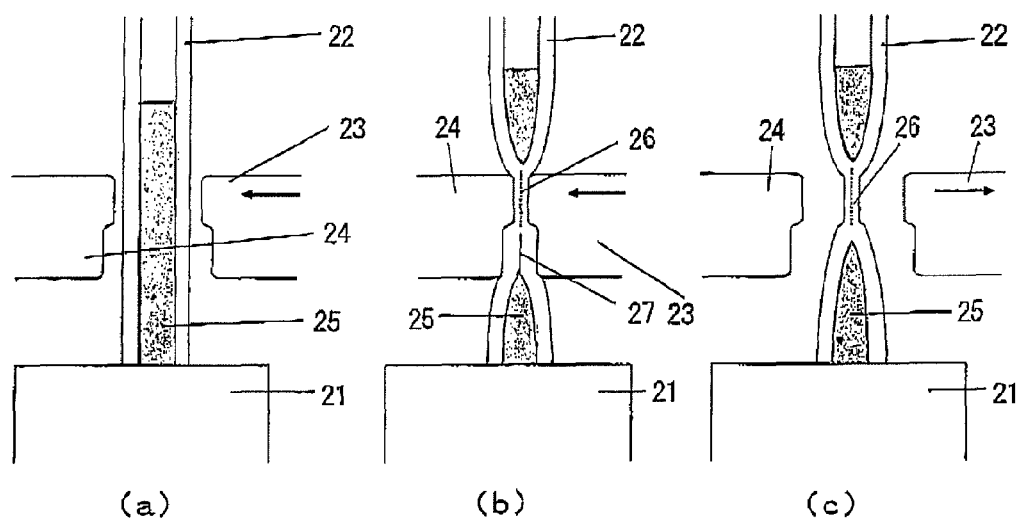
FIG. 4 shows a schematic process diagram exhibiting an embodiment of the process for producing a plastic lens of the present invention.

Process (ii) will be described in the following with reference to FIG. 4. FIG. 4 shows a schematic process diagram exhibiting an embodiment of the process for producing a plastic lens of the present invention. In FIG. 4, the mold 21 is similar to the mold 11 shown in FIG. 3.

As shown in FIG. 4(a), the inlet 22 is held by an anvil 24 and a hone 23 under a pressure in the condition such that the monomer composition 25 fills the inside of the cavity which is not shown in the figure and the inlet 22. The anvil 24 and the hone 23 each have a step-shaped depression on the holding face. Due to the presence of the depression, a great difference is formed between the pressure applied to the inner walls of the inlet 22 at the portion to be sealed by the welding 26 and the pressure applied to the inner walls of the inlet 22 at the tightly closed unwelded portion 27 which is placed between the depressions, as shown in FIG. 4(b).

Then, the portion to be sealed by the welding 26 which is pressed strongly by the anvil 24 and the hone 23 is sealed by the ultrasonic welding by transmitting the ultrasonic wave through the hone 23 under the above condition. At this time, the tightly closed unwelded portion 27 which is pressed weakly by the anvil 24 and the hone 23 is not welded since the ultrasonic wave is not transmitted sufficiently to the inner walls of the inlet 22. As the result, the portion sealed by the welding 26 and the tightly closed unwelded portion 27 are formed simultaneously. Powder of the gasket material formed at the portion sealed by the welding 26 by the ultrasonic vibration is blocked at the tightly closed unwelded portion 27 and does not diffuse into the side of the cavity from the portion sealed by the welding 26. When the ultrasonic welding is completed, as shown in FIG. 4(c), the hone 23 and the anvil 24 are released so that the holding under a pressure is released. The powder of the gasket material remains at the portion corresponding to the tightly closed unwelded portion 27 of the inlet after the hone 23 and the anvil 24 are released. In FIG. 4, the liquid surface of the monomer composition 25 in the inlet 22 is at a position beyond the portion sealed by the welding in the inlet 22. However, the above descriptions can be applied when the liquid surface of the monomer composition does not reach the portion sealed by the welding.

In the process shown in FIG. 4, both of the anvil 24 and the hone 23 have the step-shaped depression on the holding face. The depression may be formed on the holding face of either one of the anvil 24 and the hone 23 alone. The depression is formed in a manner such that the depression is substantially adjacent to the portion sealed by the welding at the side of the cavity, the inlet 22 is tightly closed under a pressure during the welding to prevent formation of gaps at the inside, and transmission of the ultrasonic wave transmitted through the hone 23 further into inner portions of the inlet 22 is suppressed. It is preferable that the depression has a great depth as long as gaps are not formed between the inner walls at the tightly closed unwelded portion 27 from the standpoint of suppressing diffusion of the powder of the gasket material formed at the portion of the ultrasonic welding and suppressing formation of fresh powder of the gasket material.

In process (ii) described above, similarly to process (i), the ultrasonic wave is transmitted while the tightly closed unwelded portion is formed between the portion to be sealed by the ultrasonic welding and the mold, and the powder of the gasket material formed at the portion sealed by the welding does not diffuse into the cavity. Due to the presence of the depression on the holding face of at least one of the hone and the anvil forming the tightly closed unwelded portion, the powder of the gasket material formed at the portion of the ultrasonic welding is attached to the inner wall of the tightly closed unwelded portion. Therefore, there is no possibility that the powder of the gasket material diffuses into the cavity. Since the possibility of fouling of the inside of the cavity can be eliminated as described above, the plastic lens exhibiting excellent transparency can be obtained without contamination with foreign substances or clouding.

As the apparatus used for the ultrasonic welding, a commercial apparatus can be used. It is preferable that the frequency of the ultrasonic oscillator is 10 to 50 kHz. The article to be sealed by welding is held under a pressure between the tip of a resonating body of vibration called a hone which transmits the ultrasonic vibration generated by the apparatus to the article to be sealed by welding and a receiving tool called an anvil, and the ultrasonic welding is conducted by generating the ultrasonic vibration in this condition. The ultrasonic vibration transmitted through the hone vibrates the faces of welding in the article to be sealed by welding, and heat of friction is generated. The materials at the faces of welding are locally melted and integrally bonded to each other. The welding is completed in this manner. The portion of the welding is extremely localized, and the time of vibration is, in general, as short as 1 second. The thermal effect on the surrounding materials is far smaller than that of the heat sealing. Therefore, the welding treatment can be conducted on the inlet held under a pressure while the monomer composition is present in the inlet.

When the position of the welding in the inlet is set at a position close to the cavity as shown by the mark 2a in FIG. 2(b), the excess amount of the monomer after the welding is suppressed to a very small amount, and almost no amount of the monomer composition is drawn into the cavity during the polymerization. Therefore, the formation of striaes in the plastic lens at portions in the vicinity of the inlet described above can be prevented.

The apparatus used for the ultrasonic welding is useful for automation and increase in the speed in the step of injection since the apparatus can be easily disposed at the apparatus for injecting the monomer composition, and the time required for the welding is very short.

The principle of the ultrasonic welding is described in the following. The ultrasonic welding is a process for welding in which a great heat of friction is generated at the faces of bonding of two bodies of a thermoplastic resin by converting the electric energy into the mechanical vibration energy and applying a pressure at the same time, and the two bodies are bonded to each other by melting of the thermoplastic resin at the faces of bonding. For the conversion of the electric energy into the mechanical energy, the electric signal of the electric energy is amplified by an oscillator. The amplified electric signal is transmitted to an oscillating element, and the transmitted electric signal is converted into the mechanical energy by the oscillating element. The energy of oscillation of the oscillating element described above is transmitted to the portions to be bonded through a resonating body of vibration called a hone.

When the hone has a size as great as the size of an article to be bonded or greater, the heat generation on the surface of the article is very limited, and most of the energy is transmitted to the interface of the articles to be bonded. A great heat of friction is generated at the interface due to the transmitted energy of vibration. The temperature is instantaneously elevated to the melting point of the thermoplastic resin, and the articles of the thermoplastic resin are welded. The time required for melting the thermoplastic resin and completing the welding is, in general) 1 second or shorter although the time is varied depending on the material of the resin and the distance between the hone and the interface.

The material monomer composition used in the present invention is not particularly limited. Examples of the material monomer composition exhibiting the effect of the process of the present invention include allyl-based monomer compositions forming allyl-based resins which are typically CR-39 resins, (meth)acrylic monomer compositions forming (meth) acrylic resins and polythiourethane-based monomer compositions forming polythiourethane resins. Examples of the polythiourethane-based monomer composition include combinations of polyisocyanate compounds and polythiol compounds and compounds having epithio group such as bis(β-epithiopropyl) sulfides and bis(β-epithiopropyl) disulfides. Examples of the polyisocyanate compound include 1,3-diisocyanato-methylcyclohexane and xylene diisocyanate. Examples of the polythiol compound include pentaerythritol tetrakis(2-mercaptoacetate), 2,5-di-mercaptomethyl-1,4-dithiane, mercaptomethyldithiaoctanedithiol and bis(mercaptomethyl)trithiaundecanedithiol.

Conventional additives used for the production of plastic lenses may be added to the material monomer composition used in the present invention as long as the effect of the present invention is not adversely affected.

Examples of the additive described above include agents for improving the property of absorption of light such as ultraviolet light absorbents, coloring agents and pigments, agents for improving weatherability such as antioxidants and agents for preventing coloring, and agents for improving the workability such as mold releases.

Examples of the ultraviolet absorbent include ultraviolet absorbents based on benzotriazole, benzophenone and salicylic acid. Examples of the coloring agent and the pigment include coloring agents and pigments based on anthraquinone and azo-compounds. Examples of the antioxidant and the agent for preventing coloring include agents based on monophenols, bisphenols, macromolecular phenols, sulfur compounds and phosphorus compounds. Examples of the mold release include fluorine-based surfactants, silicone-based surfactants, acidic phosphoric acid esters and higher fatty acids.

EXAMPLES

The present invention will be described more specifically with reference to examples in the following. However, the present invention is not limited to the examples.

Example 1

Using a polyethylene elastomer (manufactured by Sumitomo Chemical Co., Ltd., EXCELLEN FX) which was an olefin-based thermoplastic resin, a cylindrical gasket having an inlet which had a shape shown in FIG. 1 was obtained in accordance with the injection molding. The inner diameter of the cylindrical main portion of the gasket was about 80 mm, and the thickness of the wall of the inlet was 1.0 mm. Foreign substances on the surface of the gasket were removed by washing with pure water, and the gasket was sufficiently dried. Then, a glass upper mold member 3 and a glass lower mold member 4 were fitted into the openings of the cleaned cylindrical gasket as shown in FIG. 2, and a mold for a plastic lens was prepared.

A 23 liter tank of the closed type equipped with a stirring apparatus and a jacket was cooled by passing cold water adjusted at 5° C. through the jacket. Separately, 4,000 kg of 1,3-diisocyanatomethyl-cyclohexane cooled at 5° C. was weighed into a 5 liter vessel made of polyethylene. Then, 18.0 g of 2-(2'-hydroxy-5'-t-octylphenyl)benzotriazole (manufactured by SHIPRO KASEI KAISHA LTD.; SEESORB 709) as the ultraviolet light absorbent, 29.0 g of butoxyethyl acid phosphate (manufactured by Johoku Chemical Co., Ltd.; JP-506H) as the mold release and 81.0 g of dimethyltin dichloride as the polymerization catalyst were added into the 5 liter vessel, and the resultant mixture was stirred for 20 minutes. By the stirring, the additives were dissolved into 1,3-diisocyanatomethylcyclohexane, and a homogeneous solution was obtained.

The solution obtained above was transferred to the tank described above, and 4.557 kg of 1,3-diisocyanatomethylcyclohexane was added. To the resultant mixture, 4.764 kg of pentaerythritol tetrakis(2-mercaptoacetate) and 4.679 kg of 2,5-dimercaptomethyl-1,4-dithiane each cooled at 5° C. were added. The tank was tightly closed and stirred for 10 minutes, and a monomer composition was obtained.

The stirring was temporarily suspended. The tank was connected to a vacuum pump, and defoaming was started under a reduced pressure. The stirring was resumed while the condition of foaming of the monomer composition at the inside of the tank was observed. When the speed of stirring was slowly increased, the pressure was stabilized at a reduced pressure of 40 Pa. This condition was maintained for 30 minutes to perform the defoaming under a reduced pressure. Then, the pressure was released to the ordinary pressure, and the step of preparation of the monomer composition was completed.

Immediately thereafter, the tank was connected to an injection apparatus, and the monomer composition was injected into the cavity 5 as shown in FIG. 2(a) using a roller pump while a pressure of 30 kPa was applied with dry nitrogen. When the monomer composition filled the cavity and reached an upper portion of the inlet 2 as shown in FIG. 2(b), the injection was stopped.

In the mold for a plastic lens containing the injected monomer composition obtained above, a portion 2a of the inlet 2 closer to the cavity 5, as shown in FIG. 2(b), was held under a pressure and sealed by the welding using a ultrasonic tube sealing machine under a condition of a frequency of 35 kHz, a pressure of welding of 0.5 MPa, a depth of welding of 1.0 mm and a time of oscillation of 0.5 seconds so that inner faces of the portion held under a pressure were locally integrally bonded to each other by melting.

The plastic lens (Example 1) obtained by using the mold which was welded as shown in FIG. 2(b) was colorless and transparent and had the following optical properties: the refractive index (ne): 1.60; the Abbe constant (ve): 41; and the specific gravity: 1.32. The obtained plastic lens had no striaes at portions in the vicinity of the portion of the inlet and was excellent as the spectacle lens.

Comparative Example 1

Figure 5:
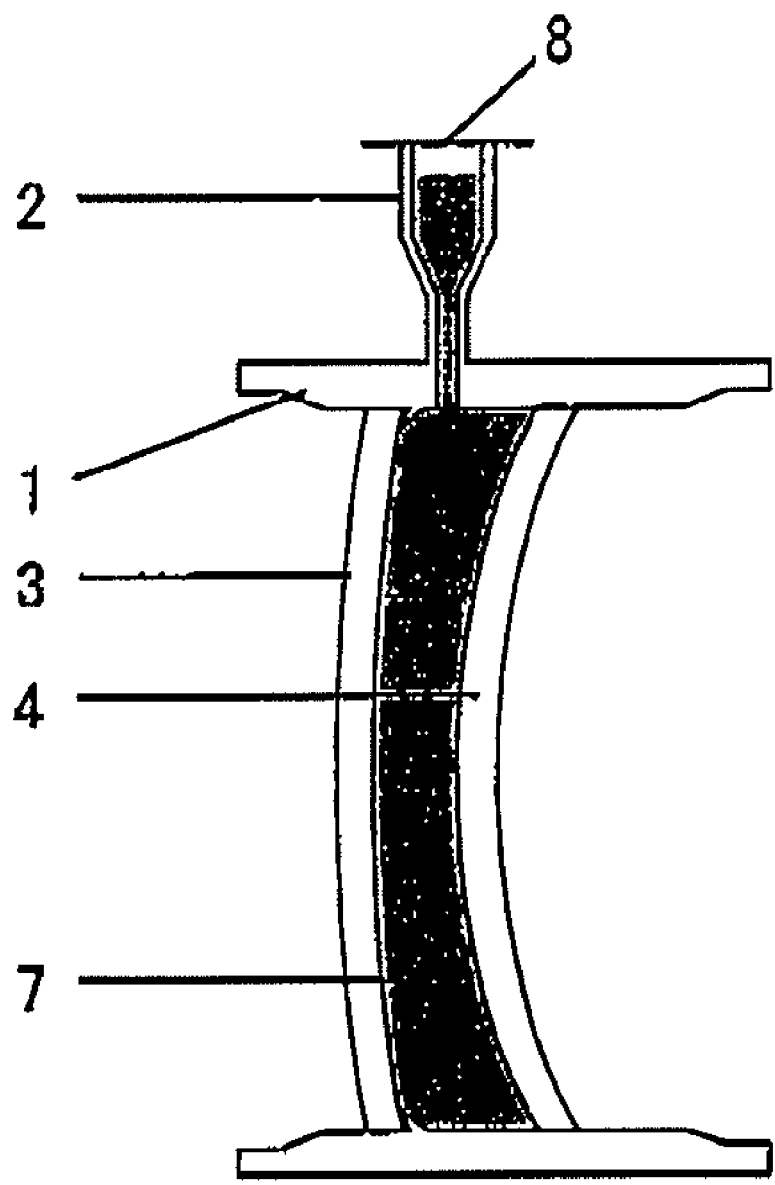
FIG. 5 shows a schematic process diagram exhibiting an example of a conventional process for producing a plastic lens.

As shown in FIG. 5, an unwelded mold for a lens having a heat seal film 8 alone in which the monomer composition described above had been injected was prepared. The unwelded mold and a welded mold were placed into a polymerization oven of the heated air circulation type, simultaneously. The temperature was raised from 30° C. to 120° C. over 24 hours, and the heating was continued at 120° C. for 3 hours. Then, these molds were taken out of the polymerization oven, and plastic lenses were taken out of the molds.

The plastic lens obtained by using the unwelded mold as shown in FIG. 5 had striaes in the vicinity of the portion of the inlet and was not suitable as the spectacle lens.

Example 2

When lenses obtained in accordance with the process described in Example 1 were observed in detail, some of the lenses had slight clouding at portions in the vicinity of the inlet. When the clouding was observed by a microscope, it was found that the clouding was formed with aggregates of transparent foreign substance having a size of about 5 microns and irregular shapes which were estimated to be powder of the gasket resin formed during the ultrasonic welding. Based on this finding, the same monomer composition as that used in Example 1 was injected into the same mold for a plastic lens as that used in Example 1, and the inlet of the mold was welded in accordance with the production steps shown in FIG. 3 using an apparatus having an ultrasonic tube sealing machine under the condition of a frequency of 35 kHz, a pressure of welding of 0.5 MPa, a depth of welding of 1.0 mm and a time of oscillation of 0.5 seconds. In the first step, as shown in FIG. 3(a), a portion of the inlet 12 was held by an anvil 14 and a pressing tool 15 under a pressure, and the inner walls of this portion of the inlet 12 were tightly attached to each other. Then, as shown in FIG. 3(b), an upper portion from the portion held by the anvil 14 and the pressing tool 15 under a pressure was held by an anvil 14 and a hone 13 under a pressure and pressed while the ultrasonic wave was transmitted through the hone 13 so that the welding of the portion to be sealed by the welding 17 was conducted. Although it was estimated that powder of the gasket material was formed from the portion sealed by the welding 17 during the ultrasonic welding, it was considered that the powder of the gasket material was not scattered in the direction of the cavity since the portion sealed by the welding 17 was blocked from the cavity by the holding by the anvil 14 and the pressing tool 15 under a pressure and remained in the portion of the inlet after the pressing tool 15 was released as shown in FIG. 3(c).

The mold for a plastic lens was placed into a polymerization oven of the heated air circulation type. The temperature was raised from 30° C. to 120° C. over 24 hours, and the heating was continued at 120° C. for 3 hours. Then, the mold was taken out of the polymerization oven, and a plastic lens was taken out of the mold. The obtained plastic lens was colorless and transparent and had the following optical properties: the refractive index (ne): 1.60; the Abbe constant (ve): 41; and the specific gravity: 1.32. The obtained plastic lens had no striaes at portions in the vicinity of the inlet. Among the lenses obtained in accordance with the process described above, no lenses having slight clouding were found unlike those in Example 1. As described above, the lens obtained in the present example was further improved from the lens obtained in Example 1 and could be advantageously used as the spectacle lens.

Example 3

In accordance with the same procedures as those conducted in Example 2, an inlet in a mold for a lens in which the monomer composition had been injected was welded in accordance with the production steps shown in FIG. 4 using an apparatus having an ultrasonic tube sealing machine under the condition of a frequency of 35 kHz, a pressure of welding of 0.5 MPa, a depth of welding of 1.0 mm and a time of oscillation of 0.5 seconds. A step-shaped depression having a depth of 0.4 mm was formed on the holding faces of both of a hone 23 and an anvil 24 at the side of the cavity as shown in FIG. 4. When the inlet was held by the hone 23 and the anvil 24 under a pressure and the ultrasonic wave was transmitted, a welded portion 26 and a tightly closed unwelded portion 27 at the side of the cavity were formed simultaneously as shown in FIG. 4(b). Although it was estimated that powder of the gasket material was formed from the portion sealed by the welding 26 during the ultrasonic welding, the powder of the gasket material was not scattered in the direction of the cavity since the scattering of the powder of the gasket material formed at the welded portion in the direction of the cavity was blocked at the portion held by the portions of the depression on the holding faces under a pressure and remained in the portion of the inlet after the hone 23 and the anvil 24 were released as shown in FIG. 4(c).

The mold for a plastic lens was placed into a polymerization oven of the heated air circulation type. The temperature was raised from 30° C. to 120° C. over 24 hours, and the heating was continued at 120° C. for 3 hours. Then, the mold was taken out of the polymerization oven, and a lens was taken out of the mold. The obtained plastic lens was colorless and transparent and had the following optical properties: the refractive index (ne): 1.60; the Abbe constant (ve): 41; and the specific gravity: 1.32. The obtained plastic lens had no striaes at portions in the vicinity of the inlet. Among the lenses obtained in accordance with the process described above, no lenses having slight clouding were found unlike those in Example 1. As described above, the lens obtained in the present example was further improved from the lens obtained in Example 1 and could be advantageously used as the spectacle lens.

INDUSTRIAL APPLICABILITY

In accordance with the present invention, the process for producing a plastic lens can be conducted efficiently at a high speed. The plastic lens produced in accordance with the process of the present invention has no striaes and can be advantageously used as the spectacle lens.

What is claimed is:

1. A process for producing a plastic lens which comprises, using a mold constituted with a pair of mold members facing each other and a plastic gasket which fixes the mold members to form a cavity and has an inlet for injecting a composition of a material monomer into the cavity, injecting the composition of a material monomer into the cavity through the inlet of the plastic gasket, sealing the inlet of the plastic gasket and, thereafter, conducting polymerization, wherein the inlet of the plastic gasket is sealed by ultrasonic welding and wherein the sealing of the inlet of the plastic gasket by ultrasonic welding is conducted under a condition such that a portion of the inlet of the gasket to be sealed by ultrasonic welding is closed under a pressure and a portion of the inlet of the gasket at a side of the cavity from the portion to be sealed by ultrasonic welding is tightly closed so as to avoid transmission of ultrasonic waves to the portion of the inlet of the gasket at a side of the cavity from the portion of the inlet of the gasket to be sealed by ultrasonic welding, wherein said portion of the inlet of the gasket at a side of the cavity from the portion to be sealed by ultrasonic welding is tightly closed so as to block any powder of gasket material formed at the portion of the inlet of the gasket to be sealed by ultrasonic welding from passing into the cavity, and wherein said portion of the inlet of the gasket at a side of the cavity from the portion to be sealed by ultrasonic welding, is not welded by ultrasonic waves for the ultrasonic welding.

2. A process for producing a plastic lens according to claim 1, wherein the closing under a pressure of the portion of the inlet of the gasket to be sealed by ultrasonic welding is conducted by holding the portion between a hone and an anvil under a pressure, and the tight closing of the portion of the inlet of the gasket at a side of the cavity from the portion to be sealed by ultrasonic welding is conducted using a pressing tool and a receiving tool facing the pressing tool simultaneously when or before the closing under a pressure is conducted.

3. A process for producing a plastic lens according to claim 1, wherein the closing under a pressure of the portion of the inlet of the gasket to be sealed by ultrasonic welding and the tight closing of the portion of the inlet of the gasket at a side of the cavity from the portion to be sealed by ultrasonic welding are conducted by holding the portions between a hone and an anvil at least one of which has a step-shaped depression on a holding face in a manner such that a portion having a greater gap between the holding faces of the hone and the anvil is disposed at a side of the cavity from the portion to be sealed by ultrasonic welding, and the closing under a pressure and the tight closing are conducted simultaneously.

4. A process for producing a plastic lens according to claim 1, wherein the plastic gasket is obtained by using an olefin-based thermoplastic resin.

5. A process for producing a plastic lens according to claim 2, wherein the plastic gasket is obtained by using an olefin-based thermoplastic resin.

6. A process for producing a plastic lens according to claim 3, wherein the plastic gasket is obtained by using an olefin-based thermoplastic resin.

7. A process for producing a plastic lens according to claim 1, wherein said portion of the inlet of the gasket at a side of the cavity from the portion to be sealed by ultrasonic welding, remains an unwelded portion.

* * * * *